(No Model.)

O. B. ROSS.
AUTOMATIC MEASURER FOR CREAMERIES.

No. 574,274.  Patented Dec. 29, 1896.

Attest:
W. J. Sankey.
J. K. Orwig.

Inventor
Oliver B. Ross,
By J. C. Sweet,
Atty.

UNITED STATES PATENT OFFICE.

OLIVER B. ROSS, OF SPENCER, IOWA.

AUTOMATIC MEASURER FOR CREAMERIES.

SPECIFICATION forming part of Letters Patent No. 574,274, dated December 29, 1896.

Application filed May 11, 1896. Serial No. 591,101. (No model.)

*To all whom it may concern:*

Be it known that I, OLIVER B. ROSS, a citizen of the United States of America, and a resident of Spencer, in the county of Clay and State of Iowa, have invented a new and useful Automatic Measurer for Creameries, of which the following is a specification.

The object of my invention is to provide means whereby the patrons of a creamery or cheese-factory may receive the allotted amount due them of the whey or skim-milk resultant after the product has undergone the necessary treatment to extract therefrom the cream or cheese material without necessitating the measuring of the individual quantities by an attendant and avoiding unequal distribution of the return products.

My invention consists in the combination of a receptacle arranged to receive milk or whey from a separating-machine and provided with inlet and outlet ports valvularly controlled, lever mechanism acting upon the valves of said ports alternately and check-operated for release.

My invention consists, further, in a receptacle provided with ingress and egress ports, lever mechanism controlling said ports, locking mechanism acting upon said lever mechanism in certain positions, a check whereby said locking mechanism is released, and float mechanism acting upon the lever mechanism to reposition the same to be locked when the desired quantity of substance has entered the receptacle, the movement of repositioning the lever mechanism resulting in a closure of the ingress-port and an opening at the egress-port of the receptacle, from which egress-port the substance flows to portable receptacles controlled by the patron.

My invention consists, further, in the construction, arrangement, and combination of elements hereinafter set forth, pointed out in my claims, and illustrated by the accompanying drawings, in which—

Figure 1:
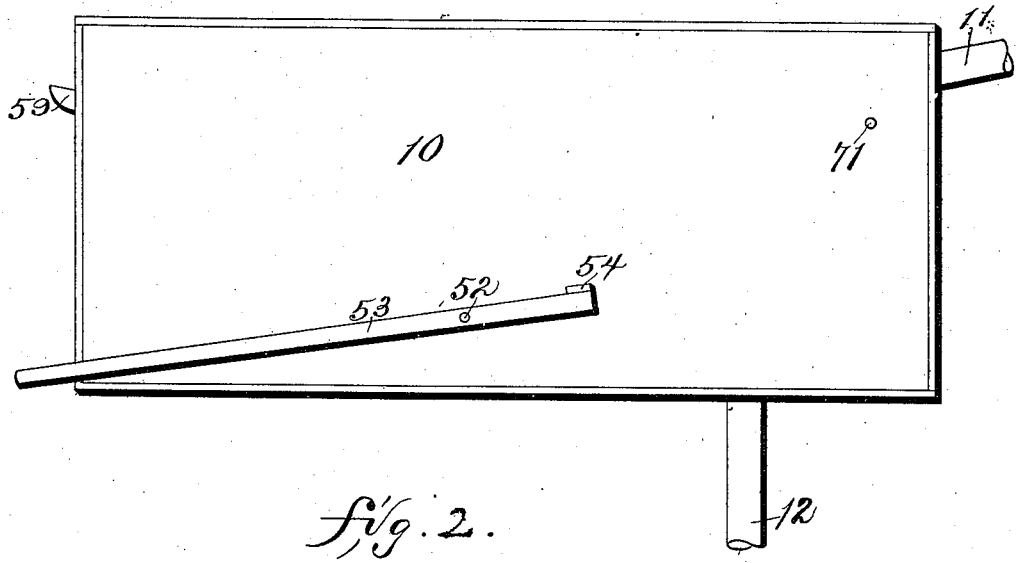
Figure 2:
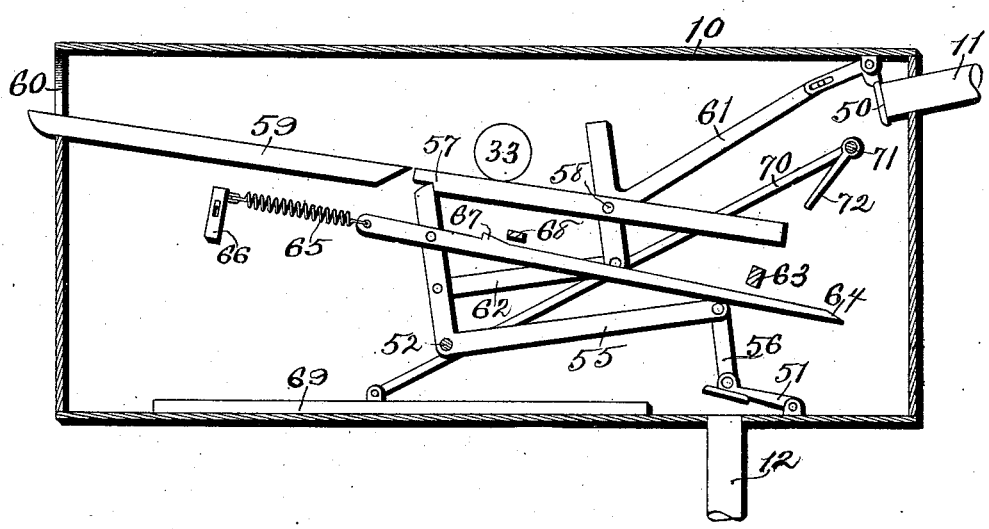

Figure 1 is a side elevation of the complete machine, showing the manually-operated lever, the ingress-pipe, the egress-pipe, and the initial end of the runway. Fig. 2 is a sectional elevation longitudinally of the machine shown in Fig. 1.

In the construction of the machine as shown the numeral 10 designates a receptacle which is also an inclosure for the major portion of the operating mechanism of the machine. At one end of the receptacle 10 is located an inlet-pipe 11, the inner end of which pipe, inside the receptacle, normally is closed by a bell-crank valve 50, fulcrumed interiorly of the receptacle. The inlet-pipe 11 leads from a separator or cheese-machine. (Not shown.) An outlet-pipe 12 leads from the bottom of the receptacle 10, and normally is opened when the inlet-pipe 11 is closed and closed when the inlet-pipe is open, which outlet-pipe is arranged to be closed by an oscillating or flap valve 51, pivotally mounted interiorly of the receptacle. A rock-shaft 52 is positioned horizontally through one side or the other of the receptacle 10 and extends outwardly therefrom. A hand-lever 53, Fig. 1, is mounted on the outer end portion of the rock-shaft 52 and is arranged to oscillate in a vertical plane. The hand-lever 53 is limited in its oscillation by a stop 54, located on the outer face of the wall of the receptacle adjacent to said lever.

A bell-crank lever 55 is mounted rigidly on the inner end of the rock-shaft 52, within the receptacle, and the horizontal arm of said lever 55 is of greater length than its vertical arm and is pivotally joined, by a connecting-rod 56, at its outer end to the valve 51. The vertical arm of the bell-crank lever 55 engages by its upper end with a notch formed in one end portion of a pivoted runway, or, rather, a pivoted portion 57 of a runway, which runway also comprises a rigid or stationary portion normally communicating with the pivoted portion approximately at the center of the receptacle and extending outwardly therefrom through a port, entrance, or slot 60 in one end of the receptacle. The portion 57 of the runway is pivoted approximately at its center on a pin or shaft 58, extended transversely of the receptacle in a horizontal position, and a bell-crank lever 61 is fulcrumed on the pin or shaft 58 and is connected at the outer end of its upper and longer arm pivotally to the arm of the bell-crank valve 50.

The lower or shorter arm of the bell-crank lever 61 is pivotally connected by a rod 62 to the central portion of the vertical arm of the bell-crank lever 55. A stop 63 is positioned on the interior of the receptacle beneath the extreme or right end of the pivoted portion 57 of the runway and serves to limit the oscillation of said runway in one direction, the oscillation of the runway being limited in the other direction by engagement with the upper end of the vertical arm of the lever 55. A rod 64 is fulcrumed near one end on the upper end portion of the vertical arm of the bell-crank lever 55 and is connected by a retractile coil-spring 65 to a block 66, adjustably mounted within the receptacle. The rod 64 is provided with a projection or stud 67 on its upper edge, arranged to engage at times with a projection or stud 68 on the interior of the receptacle and limit the reciprocation of said rod in one direction. A float 69 is positioned in the lower portion of the receptacle 10 and is connected to the lower end of an obliquely-positioned arm 70, which arm is connected at its upper end to a rock-shaft 71, located transversely of and horizontally in the receptacle 10, adjacent to the delivery-port of the inlet-pipe 11. A crank-arm 72 is fixed to the rock-shaft 71 and projects in a plane divergent from the plane of the arm 70 into close proximity with the extreme or right end of the pivoted portion 57 of the runway.

A plurality of checks, counters, or operating devices 33 are provided, which devices shall be of a predetermined size, weight, and substance, determined and limited by the functions and operation about to be described, one of which devices is shown resting upon the pivoted portion 57 of the runway. In the practical operation of the machine the inlet-pipe 11 is put in communication with the source of milk or whey supply, and a can or receptacle belonging to or used by the patron is put in communication with the outlet or egress pipe 12, the first function being performed by the creamery attendant and preferably made continuous or permanent, and the second function being performed by the patron and changeable according to the successive patrons served and the capacity of the movable receptacle used. The weighmaster of the creamery or cheese-factory gives to each patron one or more of the checks, counters, or operating devices 33, the number of the devices given being dependent upon the relation between the capacity of the receptacle 10 to receive milk and the quantity of milk it is desired to return to the patron.

The patron introduces successively the checks to the machine, and since the operation of the machine by each successive check is identical I will describe one operation only.

The patron places a check upon the rigid portion 59 of the runway and impels the same through the slot 60. The check travels along the inclined rigid portion 59 of the runway to, upon, and along the pivoted portion of the runway until it reaches the extreme or right end of said pivoted portion 57 of the runway. When the check 33 reaches the extreme or right end of the pivoted portion 57 of the runway, the weight of said check tilts the runway into engagement with the stop 63 and the check is retained on said runway to retain the same in a tilted position by engagement of the crank-arm 72. When the pivoted portion 57 of the runway is tilted, the upper end portion of the vertical arm of the bell-crank lever is released from engagement with the notch in the runway, and at this time the patron lifts the outer end of the lever 53 and in so doing oscillates the shaft 52 and the bell-crank lever 55, rigidly mounted on said shaft.

In the oscillation of the bell-crank lever 55 the valve 51, controlling the outlet-pipe 12, is closed by one end of said lever, and the valve 50, controlling the delivery-port of the inlet-pipe 11, is opened by the other arm of the bell-crank lever 55 through the reciprocation of the rod 62 and consequent oscillation of the bell-crank lever 61 and valve 50. The valve 51 being closed and the valve 50 open, it follows that the receptacle 10 will fill with milk or whey until such time as the positions of the valves are reversed, which is accomplished as follows: The float 69 rises with the milk or whey within the receptacle 10, carries with it the arm 70, thereby oscillating the shaft 71 and the arm 72 thereon until such time as said arm rises beyond the periphery of the check 33, resting thereagainst, and releases said check. When the patron operates the lever 53 and oscillates the bell-crank lever 55, the vertical arm of said bell-crank lever carries the rod 64 longitudinally against the resilience of the spring 65 to such an extent that the stud 67 passes the stud 68, and upon the release of the lever 53 by the patron the stud 67 engages the stud 68 and locks the rod 64 against the resilience of the spring. When the check 33 is released from engagement of the crank-arm 72, said check advances and rolls from the extreme or right end of the pivoted runway and said runway immediately repositions itself approximately in the position shown in Fig. 2. The check strikes the outer end portion of the rod 64 and depresses the same, oscillating said rod upon its pivot and releasing the engagement of the stud 67 with the stud 68. Upon the release of the rod 64 from the stud 68 the spring 65 immediately withdraws the rod 64 to the position shown in Fig. 2, and in so doing oscillates the bell-crank lever 55 and shaft 52, carrying the same reversely. In the reverse oscillation of the bell-crank lever 55 the horizontal arm thereof opens the valve 51 to permit the milk to flow through the egress-pipe 12 into the patron's receptacle, and the vertical arm thereof closes the bell-crank valve 50, through the medium of the rod 62 and bell-crank lever 61, to cut off the ingress of milk to the receptacle. The movements of the bell-crank lever 55 effect the positioning of the valves 50 51 simultaneously.

When the rod 64 is released from the stud 68, the lever 53 falls until stopped by engagement with the stud 54, and the weight of the long arm of said lever assists in the oscillation of the shaft 52 and bell-crank lever 55. Upon the release of the rod 64 from the projection 68 the check 33 falls from said rod and lodges in the receptacle. Upon the withdrawal of the rod 64 by the spring 65 the upper end portion of the vertical arm of the bell-crank lever 55 engages in the notch of the pivoted runway and is locked thereby against the weight of the milk in the inlet-pipe 11 and communicating therewith. The apparatus is now positioned for the introduction of a successive check. In this connection the valves 50 51 form means for controlling the ports of the inlet and outlet pipes. The bell-crank lever 55, bell-crank lever 61, and rods 56 62 provide lever mechanism operating the port-closing means. The notched end of the pivoted runway and the lugs 67 68 provide locking mechanism engaging the lever mechanism, and the float 69, arm 70, and shaft 71 constitute the float mechanism.

This application employs some of the features shown and described in an application, Serial No. 598,956, filed July 13, 1896, and pending concurrently herewith, to which reference is hereby made and which contains a cross-reference hereto, having been divided out of this application.

I claim as my invention—

1. A milk-measurer comprising a receptacle, inlet and outlet pipes communicating with said receptacle, valves controlling the inlet and outlet pipes and their communication with the receptacle, lever mechanism, comprising two bell-crank levers suitably connected, for operating the port-closing valves, locking mechanism comprising a pivoted runway engaging one of said bell-crank levers to hold the valves in one position, locking mechanism comprising interengaging studs to hold the valves in another position, which locking mechanisms are arranged to be successively released by a traveling check, a movable stop arranged to interrupt the travel of the check between the first and second locking mechanisms, float mechanism acted upon by fluid substance within the receptacle to move the movable stop, a hand-lever arranged to operate the lever mechanism when the first locking mechanism is released by the check, and a spring arranged to operate the lever mechanism when the second locking mechanism is released by the check.

2. A receptacle having inlet and outlet pipes, valves located within the receptacle and controlling said pipes, levers 55, 61, pivotally connected and connected to said valves, an ingress-port for a check or operating device, a pivoted runway arranged to lock the levers in one position and check-releasable, a lever arranged for manual actuation and connected with the lever 55, a rod arranged to lock the levers in another position and check-releasable and a float-controlled stop interrupting and distinguishing for a predetermined period the successiveness of the check-releasing operations.

3. The combination of a receptacle for return products having ingress and egress ports, an inclosure above said receptacle and communicating therewith, a lever mounted in the inclosure, a trigger spring-pressed to lock said lever in a given position, a raceway leading from the exterior to said trigger, a stop adjacent to the end of the lever when in its lowest position arranged to engage and retain a check thereon, a check-receiver communicating with the inclosure adjacent to said stop and a float mechanism for elevating the lever into engagement with the trigger and arranged to discharge the check from the lever to the receiver.

4. The combination of a receptacle provided with ingress and egress ports, valves alternately closing and opening said ports successively, lever mechanism manually actuated in one direction to operate said valves and spring-actuated in the other direction to operate said valves, locking mechanism to retain said mechanism in a given position, a check for releasing said locking mechanism, intermeshing projections for locking said lever mechanism in another position, a float acting to release the check from the first locking mechanism and so arranged as to permit said check to disengage the intermeshing projections and an aperture and runway whereby the check is directed to the locking mechanism.

5. The combination of a receptacle having inlet and outlet pipes, a valve controlling the inlet-pipe, a valve controlling the outlet-pipe, a runway 59, a pivoted runway communicating with the runway 59, a bell-crank lever pivoted coincidently with the pivoted runway and connected to the valve controlling the inlet-pipe, a bell-crank lever fulcrumed within the receptacle and connected with the valve controlling the outlet-pipe, the runways being arranged to receive a check through an ingress-slot and provide an inclined way for said check across the receptacle, a bell-crank lever having an arm arranged to obstruct the passage of the check from the pivoted runway, a float attached to said bell-crank lever, a lever 53 whereby the bell-crank lever controlling the outlet-valve is operated, locking mechanism and connections between the locking mechanism and pivoted runway whereby when the check falls from the pivoted runway the locking mechanism is released.

6. An inclosed receptacle having a port in one end for the admission of an operating-check, ingress and egress pipes communicating with said receptacle and valvularly controlled in open and closed positions respectively, a manually-operated lever outside of said receptacle, connections between said lever and the valves, whereby the positions of said valves may be reversed and check-controlled locking mechanism governing the connections between said lever and valves.

7. In a machine of the class described, a check-controlled mechanism consisting essentially of the following elements, to wit: valve-levers, a runway arranged to lock said valve-levers pending the application to said runway of an operating-check whereby said runway is tilted against its natural gravity, a movable stop whereby said check is engaged and retained on the runway after said runway is tilted, a float connected to said movable stop and acted upon by liquid within the machine whereby said stop is withdrawn from engagement with and releases the check, interengaging lugs whereby the valve-levers are locked in another position and a releasing rod or trigger arranged to receive an impact of the operating-check when said check is released by the stop aforesaid and in turn release the interengaging lugs, a hand-lever whereby the valve-levers are moved in one direction while the check is retained by the stop and a spring whereby the valve-levers are moved in the opposite direction when the rod is released by impact of the check.

8. In a machine of the class described, a check-controlled mechanism consisting of the following elements, to wit: an inlet-pipe-controlling valve; an outlet-pipe-controlling valve, connected levers pivotally connected to said valves, whereby said valves may be alternately opened and closed respectively simultaneously; a runway locking said levers in one position and check-operated to release the levers; a movable stop whereby the check is retained in engagement with the runway; a float whereby the movable stop is caused to travel; a hand-lever whereby the connected levers are operated in one direction; a locking-rod whereby the connected levers are locked in the position into which they are moved by the hand-lever; the said locking-rod being check-operated for release; and a spring whereby the connected levers are reversely moved when the locking-rod is check-released.

9. In a device of the class described, a locking-lever fulcrumed near one end on a movable fulcrum, a lug on the locking-lever arranged to engage a mating lug suitably supported in proximity thereto, a spring acting to move said locking-rod in one direction, a check-runway located above the locking-rod and a stop to limit the movement of the check and arranged to retain said check temporarily in advance of the impact thereof with the locking-rod.

10. In a machine of the class described, a locking-rod mounted for oscillation and rectilinear reciprocation, which rod is check-operated for oscillation, manually operated for movement rectilinearly in one direction and spring-operated for oscillation and rectilinear movement in the opposite direction.

11. In a machine of the class described, a stop mechanism comprising a float, a float-arm and a stop or crank arm connected to said float-arm and arranged in the path of travel of a check.

12. In a machine of the class described, a locking-rod arranged for check operation for release, a check-runway pivoted above the locking-rod, a stop limiting the oscillation of the check-runway in one direction, a movable stop limiting and interrupting the travel of a check on said runway temporarily, the stop being arranged to travel out of engagement with the check whereby the check may fall upon the locking-rod.

13. In a machine of the class described, an inlet-valve 50, a bell-crank lever 61 connected by one arm to said valve, an outlet-valve 51, a bell-crank lever 55 connected to said outlet-valve by one arm, the other arms of the bell-crank levers being interconnected and means for operating said levers.

OLIVER B. ROSS.

Witnesses:
   ED. F. COBB,
   H. W. BROADGATE.